(12) United States Patent
Gindele et al.

(10) Patent No.: US 11,614,219 B2
(45) Date of Patent: Mar. 28, 2023

(54) LIGHTING DEVICES WITH LIGHT CONVERSION ELEMENTS

(71) Applicant: SCHOTT AG, Mainz (DE)

(72) Inventors: Frank Gindele, Schweitenkirchen (DE); Edgar Pawlowski, Stadecken-Elsheim (DE); Christian Rakobrandt, Schwindegg (DE); Christoph Stangl, Buch am Erlbach (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/989,680

(22) Filed: Aug. 10, 2020

(65) Prior Publication Data

US 2021/0041084 A1 Feb. 11, 2021

(30) Foreign Application Priority Data

Aug. 9, 2019 (DE) ..................... 10 2019 121 507.2

(51) Int. Cl.
*F21V 9/32* (2018.01)
*F21V 8/00* (2006.01)
*F21V 29/502* (2015.01)
*F21V 29/70* (2015.01)
*F21Y 115/30* (2016.01)

(52) U.S. Cl.
CPC .............. *F21V 9/32* (2018.02); *F21V 29/502* (2015.01); *F21V 29/70* (2015.01); *G02B 6/0005* (2013.01); *F21Y 2115/30* (2016.08)

(58) Field of Classification Search
CPC ..... F21K 9/64; F21K 9/68; F21K 9/69; G02B 6/005; F21V 9/32; F21V 29/70; F21V 29/502; F21V 7/24–30
See application file for complete search history.

(56) References Cited

U.S. PATENT DOCUMENTS

| | | | |
|---|---|---|---|
| 2015/0062955 A1 | 3/2015 | Sorg | |
| 2015/0233544 A1* | 8/2015 | Kircher | ..................... F21V 9/32 362/84 |
| 2016/0341673 A1 | 11/2016 | Kuchler | |
| 2017/0276299 A1 | 9/2017 | Yamashita | |
| 2018/0202625 A1 | 7/2018 | Feil | |
| 2020/0116322 A1* | 4/2020 | Eberhardt | ............. C09K 11/02 |

FOREIGN PATENT DOCUMENTS

| | | |
|---|---|---|
| DE | 102013217319 | 3/2015 |
| DE | 102015209340 | 11/2016 |
| DE | 102017101008 | 7/2018 |
| WO | 2010106504 | 9/2010 |
| WO | 2011010237 | 1/2011 |
| WO | 2013024246 | 2/2013 |

\* cited by examiner

*Primary Examiner* — Anabel Ton
(74) *Attorney, Agent, or Firm* — Ruggiero McAllister & McMahon LLC

(57) ABSTRACT

A lighting device is provided that includes light emitting unit that emits primary light and a light conversion element that is illuminated with the primary light and emits secondary light of another wavelength. The light conversion element has a front side defining a primary light receiving surface that received the primary light and a secondary light emitting surface that emits the secondary light. The light conversion element has a variable thickness at the primary light receiving surface and/or in the secondary light emitting surface.

20 Claims, 5 Drawing Sheets

LIGHTING DEVICES WITH LIGHT CONVERSION ELEMENTS

CROSS REFERENCE TO RELATED APPLICATIONS

This application claims the benefit under 35 USC 119 of German application 10 2019 121 507.2 filed on Aug. 9, 2019, the entire contents of which are incorporated by reference.

BACKGROUND

1. Field of the Invention

The invention relates to a lighting device comprising a light emitting unit, which is configured for the purpose of emitting primary light, and a light conversion element, which is configured for the purpose of being illuminated with the primary light and of emitting secondary light of another wavelength.

2. Description of Related Art

Lighting devices are known in different embodiments, for example so-called discharge and halogen lamps. Lighting devices based on laser light sources are of increasing interest, preferably with simultaneously higher luminance for various reasons, for example, with respect to energy efficiency or a small space requirement. Usually these devices are constructed so that they comprise at least one laser light source, such as, for example, a laser diode, as well as a light conversion element.

The light conversion element serves for the purpose of absorbing the light of the laser light source and to emit it again at another wavelength, since the light beamed from the laser light source or from laser light sources usually does not have the desired color location, for example, the color-neutral "white" color location or color coordinates. The light conversion element or the light conversion elements, after being irradiated with the light of the laser light source or laser light sources, e.g., with a wavelength of 450 nm in the case of a blue laser, which is usually monochromatic, is or are able to convert this light partially or completely into one or more other wavelengths or into a specific wavelength spectrum. In this way, by additive color mixing of the scattered light and the converted light, a light image with desired or specified color coordinates can be produced.

The light conversion element is also referred to as a converter (e.g., Ce: YAG), a luminescent element, or (English) phosphor, wherein the term "phosphor" here is not to be understood in the sense of the chemical element of the same name, but rather refers to the property of this substance to luminesce. In the sense of the present disclosure, therefore, the concept of "phosphor", insofar as nothing is expressed to the contrary, is always to be understood as a luminescent substance, and not the chemical element of the same name.

Such lighting devices based on laser light sources have special importance, in particular, since in this way, a high luminance or light density (English: luminance) can be obtained, which may be relevant particularly for applications in the automobile sector, for example.

Frequently it is also a goal to achieve a particularly high luminance and to do so at low laser power, in order to obtain not only a high luminance, but also to keep the power consumption as small as possible. This can be achieved by producing a light spot with only a small dimension, for example with only a small diameter (e.g., smaller than 500 micrometers), but with a correspondingly high luminance.

The phosphor used can be operated, on the one hand, in transmittance and, on the other hand, in remission (reflectance). Frequently, phosphors (light conversion elements) are used in direct contact with an LED chip and are designed planar, like a small disc.

Moreover, the international Patent Application WO10106504A1 describes a wavelength conversion element with convex curvature. The international Patent Application WO11010237A1 describes a wavelength conversion element with convex curvature and/or array. The international Patent Application WO13024246A1 describes a wavelength conversion element with optically integrated convex structures.

SUMMARY

It has turned out, of course, that a synchronization of optical parameters within the lighting spot, such as color coordinates, for example, is not ensured with the known lighting devices. In particular, in the case of a planar converter, when it is excited with a blue light, it has been shown surprisingly that the color coordinates are not constant out over the spatial extent of the light spot. A control of optical parameters is also not always sufficiently assured even in the case of convex converters with lighting on the back side.

It is thus an object of the invention to provide a lighting device that makes possible a targeted synchronization of optical parameters, e.g., color coordinates, within the lighting spot, wherein the synchronization is particularly made possible essentially via the entire surface area of the converter. Thus, a lighting device shall be provided with which the optical parameters can be influenced in such a way that they satisfy defined specifications. One aspect of the object is also to provide a lighting device that fulfills predefined requirements with respect to the optical properties, wherein the lighting device has a very high luminance preferably of white light. Another aspect of the object is to provide a corresponding lighting device that can be produced cost-effectively.

This object is achieved by a lighting device as disclosed herein.

The lighting device comprises a light emitting unit and a light conversion element, wherein the light emitting unit is configured for the purpose of illuminating the light conversion element, so that the latter can emit secondary light. In other words, the light emitting unit is configured for the purpose of emitting primary light, whereas the light conversion element is configured for the purpose of being illuminated with primary light and of emitting secondary light of another wavelength.

According to the invention, the light conversion element is further configured for the purpose of being illuminated on its front side with the primary light, wherein the primary light strikes the front side in the region of a primary light receiving surface (which may correspond particularly to the light spot of the primary light on the front side of the light conversion element, but it may also deviate therefrom). The light emitting unit is thus arranged or configured for the purpose of irradiating the light conversion element with primary light on its front side. According to the invention, the light conversion element is in turn configured for the purpose of emitting the secondary light on the front side, wherein the emission occurs in the region of a secondary light emitting surface, which in the simplest case can correspond to the primary light receiving surface, but basically also can deviate therefrom. In other words, the light emitting unit and/or the light conversion element is or are designed and/or arranged so that a remission operation (reflectance operation) can occur.

According to the invention, the light conversion element has a variable thickness in the region of the primary light receiving surface and/or in the region of the secondary light emitting surface. In particular, the thickness is understood as the dimension of the light conversion element that runs along the lighting direction of the secondary light.

With the above-described construction in which a laser beam can be irradiated, e.g. perpendicularly and laterally, and/or the excitation spot of the laser, e.g., can also essentially have the size of the converter, as will be discussed in more detail below, it is possible to fine-tune the shape of the converter to the laser beam in such a way that optical parameters such as, e.g., the color coordinates, satisfy defined specifications. An example of this is the obtaining of homogeneous color coordinates out over the spatial extent of the light spot.

Accordingly, a lighting device is provided, with which predefined requirements on the shape of the converter material can be fulfilled with respect to the optical properties of the light spot. The invention further makes it possible to obtain very high luminance and beaming power, preferably with white light. In this way, a homogeneity or synchronization of the optical properties within the light spot can be achieved for the particular application.

An influencing of the optical parameters can basically also be made possible via the excitation intensity of the laser, the temperature, or the material composition of the phosphor. In contrast to this, the invention provides another possibility, namely by variation of the thickness of the light conversion element. Advantageously, a combination of the invention with other possibilities for influencing the optical parameters is likewise possible.

By varying the thickness of the light conversion element, optical parameters within the spatial extent of the light spot can be controlled in a targeted manner, since these are determined in particular by the scattering and conversion behavior of the phosphor. for example, it can be provided that the thickness of the converter is locally smaller, and in this way, a color component, e.g., the yellow component, of the secondary radiation is changed at this spatial position, for example, it is reduced. In this way, the homogeneity of the color coordinates can be caused to increase overall.

With the lighting device according to the invention, a high luminance or light density (English: luminance) can also be achieved advantageously, which can be of importance, in particular for applications, for example, in the automobile sector, in the aviation sector, in medical lighting, and in the general lighting sector, e.g., stage lights, spotlights. It is thus possible to also obtain a particularly high luminance and to do so at low laser power, in order to obtain not only a high luminance, but also to keep power consumption as low as possible. For this purpose, a light spot of only a small dimension, for example of only a small diameter, but with correspondingly high luminance, can also be provided. In particular, in the named applications, the requirements for the light spot, properties that are as homogeneous as possible or properties that are adjusted to advanced optics, are frequently relevant. This can be made possible as described by this invention, by synchronizing the shaping of the converter material to the laser spot.

Thus, a solution is provided by the invention for producing a cost-effective converter arrangement that provides the synchronization of the optical properties in the light spot and provides for this purpose a desirable high accuracy in the alignment in the total system.

As described initially, a lighting device can be constructed so that, in addition to the light conversion element, it comprises a laser light source. Of course, it is not absolutely necessary that it comprises a laser light source; for example, it may comprise only a light guide that emits primary light, whereby the light guide in turn can be connected to a laser light source, in order to introduce the light into the light guide. The lighting device according to the invention accordingly comprises at least one light emitting unit that is configured for the purpose of emitting primary light.

In one variant, the light emitting unit can comprise a light source, in particular a laser light source, which is configured for the purpose of emitting primary light for illuminating the light conversion element.

Alternatively or additionally, it can also be provided that the light emitting unit can comprise a light guide, in particular a fiber optic light guide, which is configured for the purpose of emitting primary light for illuminating the light conversion element.

Further, alternatively or additionally, it can also be provided that the light emitting unit can comprise a lens, which is configured for the purpose of emitting primary light for illuminating the light conversion element.

The light emitting unit is preferably arranged in such a way that the primary light is irradiated laterally onto the light conversion element, whereby the primary light is particularly irradiated along an optical axis, which proceeds to a central axis, i.e., the axis that runs through the center of the front side of the light conversion element, in particular as the normal line to the surface, of the light conversion element, and/or has an angle of greater than 30 degrees, preferably greater than 45 degrees, particularly preferred of greater than 60 degrees relative to an optical axis of the secondary light.

Preferably, the light emitting unit is configured for the purpose and/or is arranged in such a way that the primary light receiving surface inside which the light conversion element is illuminated with the primary light, is smaller than 1 square millimeter, preferably smaller than 0.5 square millimeter, particularly preferred smaller than 0.2 square millimeter.

The light emitting unit or units, which emits or emit the primary light, preferably have a radiant power of at least 0.5 W. Further, it can be provided that the secondary light has a luminance of at least 50 cd/mm$^2$.

The light conversion element is preferably designed as chip-shaped and/or disc-shaped. Crosswise or perpendicular to the thickness, i.e., along the direction along which the front side extends, the light conversion element accordingly preferably has a dimension that is greater than its thickness. The light conversion element can be designed, e.g., as round or square/rectangular As already described above, the light conversion element has a variable thickness, i.e., there are at least two different thicknesses for different sites on the front side. Preferably, the light conversion element has in the center, i.e., where the central axis runs, a greater thickness than on an edge distanced from the central axis.

It can be provided that the light conversion element has a curved surface, in particular a convex surface, e.g. on the front side, and/or has a surface tapered out toward the edge, e.g., on the front side.

Preferably, the variable thickness of the light conversion element is designed in such a way that the light conversion element has as maximum thickness a dimension of 1 mm (greatest thickness) and as minimum thickness a dimension of 0.02 mm (smallest thickness). In general, it can be provided in particular that the variable thickness is designed in such a way that the light conversion element has as maximum thickness a dimension of greater than 0.1 mm, in particular greater than 0.5 mm, and as minimum thickness a dimension of less than 0.1 mm, in particular of less than 0.05 mm.

The variable thickness of the light conversion element is preferably designed in such a way that an optical parameter of the secondary light, in particular a color coordinate, satisfies a predefined specification, in particular when the light conversion element is irradiated with monochromatic primary light.

The variable thickness of the light conversion element can be roughly designed in such a way that one or more color coordinates of the secondary light has or have over the region of the primary light receiving surface and/or over the region of the secondary light emitting surface a variation of less than 0.25, preferably of less than 0.15, preferably of less than 0.05, in particular when the light conversion element is irradiated with monochromatic primary light.

An advantage of the remission operation (reflectance operation) is that the light conversion element can be cooled from the back side. Therefore, in a preferred embodiment, the lighting device comprises a base body that is designed in particular as a heat sink, wherein the light conversion element is introduced indirectly or directly on the base body. The light conversion element can thus be fastened directly onto the base body or it also can be fastened onto an intermediate element, which in turn is fastened onto the base body.

Preferably, the lighting device comprises an alignment element for aligning the light conversion element relative to the primary light, so that in particular, the front side and/or the primary light receiving surface on the front side of the light conversion element can be adjusted. The light conversion element is preferably introduced onto the alignment element and the alignment element is in turn preferably introduced onto the base body.

The invention further relates to a light conversion element, which, as already described above, is configured for the purpose of being illuminated with primary light and emitting secondary light of another wavelength, wherein the light conversion element has a front side and is configured for the purpose of being illuminated with the primary light in the region of a primary light receiving surface on the front side, and of emitting the secondary light in the region of the secondary light emitting surface on the front side, and wherein the light conversion element has a variable thickness in the region of the primary light receiving surface and/or in the region of the secondary light emitting surface.

Such a light conversion element according to the invention may have in the center, through which the central axis runs, a greater thickness than at an edge distanced from the central axis, and/or a curved, in particular convex, front side, and/or have a front side tapered out to the edge, whereby reference is made also to the preceding statements for this.

The variable thickness of the light conversion element can be designed in such a way that an optical parameter of the secondary light, in particular a color coordinate, satisfies a predefined specification, wherein the variable thickness of the light conversion element can be designed in such a way that one or more color coordinates of the secondary light has or have over the region of the primary light receiving surface and/or over the region of the secondary light emitting surface a variation of less than 0.25, preferably of less than 0.15, preferably of less than 0.05, wherein reference for this is in turn made to what has been stated above.

The invention further relates to a light conversion device comprising a base body that is particularly designed as a heat sink, and a light conversion element corresponding to the preceding statements, which is introduced indirectly or directly on the base body.

The light conversion device according to the invention can further comprise an alignment element for aligning the light conversion element relative to the primary light, wherein the light conversion element can be introduced onto the alignment element and the alignment element in turn can be introduced onto the base body, for which again reference is made to what has been said above.

The invention also relates to a method for processing a light conversion element.

In this case, initially, there is provided a light conversion element, which is configured for the purpose of being illuminated with primary light and of emitting secondary light of another wavelength. This light conversion element is then processed by removing material of the light conversion element, in particular material on the front side and/or at the edge of the light conversion element, in order to locally change the thickness of the light conversion element.

In the processing of the light conversion element, the thickness of the light conversion element is particularly changed in such a way that an optical parameter of the secondary light, in particular a color coordinate, satisfies a predefined specification, in particular when the light conversion element is irradiated with monochromatic primary light.

Preferably, the thickness of the light conversion element is changed in such a way that one or more color coordinates of the secondary light has or have over the region of the primary light receiving surface and/or over the region of the secondary light emitting surface a variation of less than 0.25, preferably of less than 0.15, preferably of less than 0.05.

Finally, the invention relates also to a method for producing a light conversion device.

In this case, initially, a processed light conversion element as explained above is provided. This processed light conversion element is then arranged and/or fastened onto a base body, which is particularly designed as a heat sink. Alternatively, the processed light conversion element can also be arranged and/or fastened onto an intermediate element, e.g., onto an alignment element for aligning the light conversion element relative to the primary light of a light emitting unit, wherein this intermediate element in turn is arranged and/or fastened onto the base body.

BRIEF DESCRIPTION OF THE DRAWINGS

The invention will be explained below in more detail on the basis of several figures. Shown herein.

DETAILED DESCRIPTION

Figure 1:
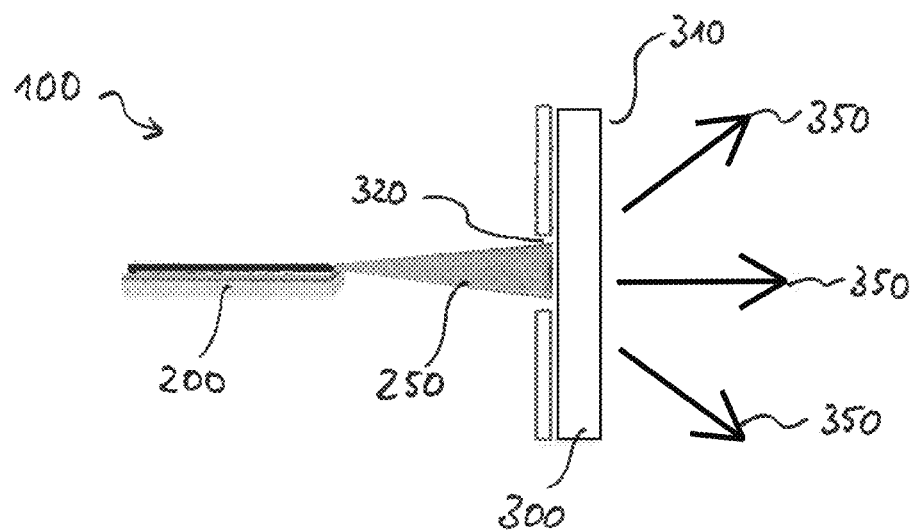
FIG. 1 a lighting device known from the prior art, in which a light conversion element (converter) is used in the transmittance operation.

FIG. 1 shows a lighting device 100, which is known from the prior art, and which is designed for the transmittance operation. The lighting device 100 comprises a light emitting unit 200, which is designed as a laser diode, with which primary light 250, e.g., blue light, is beamed onto the back side 320 of a light conversion element 300. The light conversion element 300 accordingly receives the primary light 250 on the back side 320 and emits secondary light 350 on the front side 310.

Figure 2:
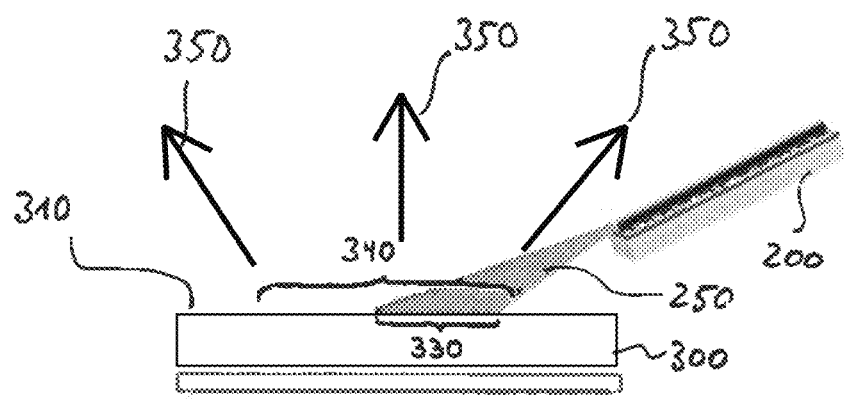
FIG. 2 a lighting device in which a converter is used in the remission operation.

FIG. 2 shows a similar lighting device 100, but which is designed for the remission operation (reflectance operation). Here, the light emitting unit 200 beams onto the front side 310 of the light conversion element 300, wherein the front side is illuminated in the region of a primary light receiving surface 330. The light conversion element 300 emits the secondary light 350 onto the front side 310 in the region of a secondary light emitting surface 340.

FIG. 3 again shows a similar lighting device 100, which is designed for the remission operation (reflectance operation), wherein the light conversion element 300 is configured for the purpose of being illuminated with the primary light 250 in the region of a primary light receiving surface 330 on the front side 310, and emitting the secondary light 350 on the front side 310 in the region of a secondary light emitting surface 340, wherein the light conversion element 300 is further introduced onto a base body 400 designed as a heat sink.

In this case, the principle of exciting the light conversion element 300, which is formed as a planar phosphor chip 300, with the primary light 250, which is formed as a laser beam, is employed. The optical parameters within the spatial extent of the light spot are inhomogeneous and are determined by the scatter and conversion behavior of the phosphor. An influencing of the optical parameters is basically possible, e.g., via the excitation intensity of the laser, the temperature, or the material composition of the phosphor. In order to achieve or optimize a homogeneity or synchronization of the optical properties to the particular application, the present invention offers, however, the possibility of the thickness variation, as described below.

Figure 3:
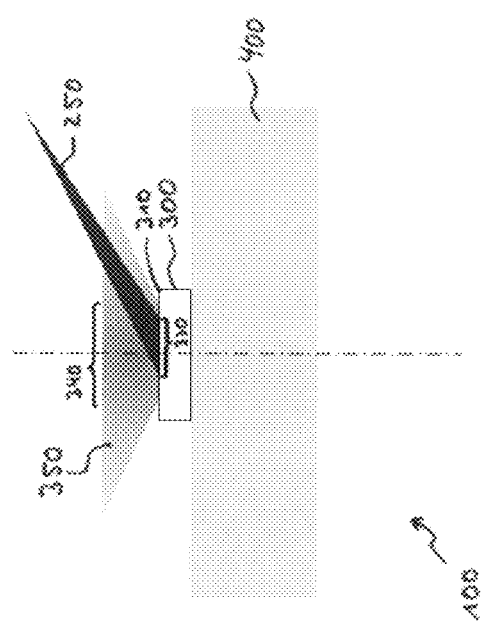
FIG. 3 a lighting device corresponding to FIG. 2, in which the converter is introduced onto a heat sink.
Figure 4:
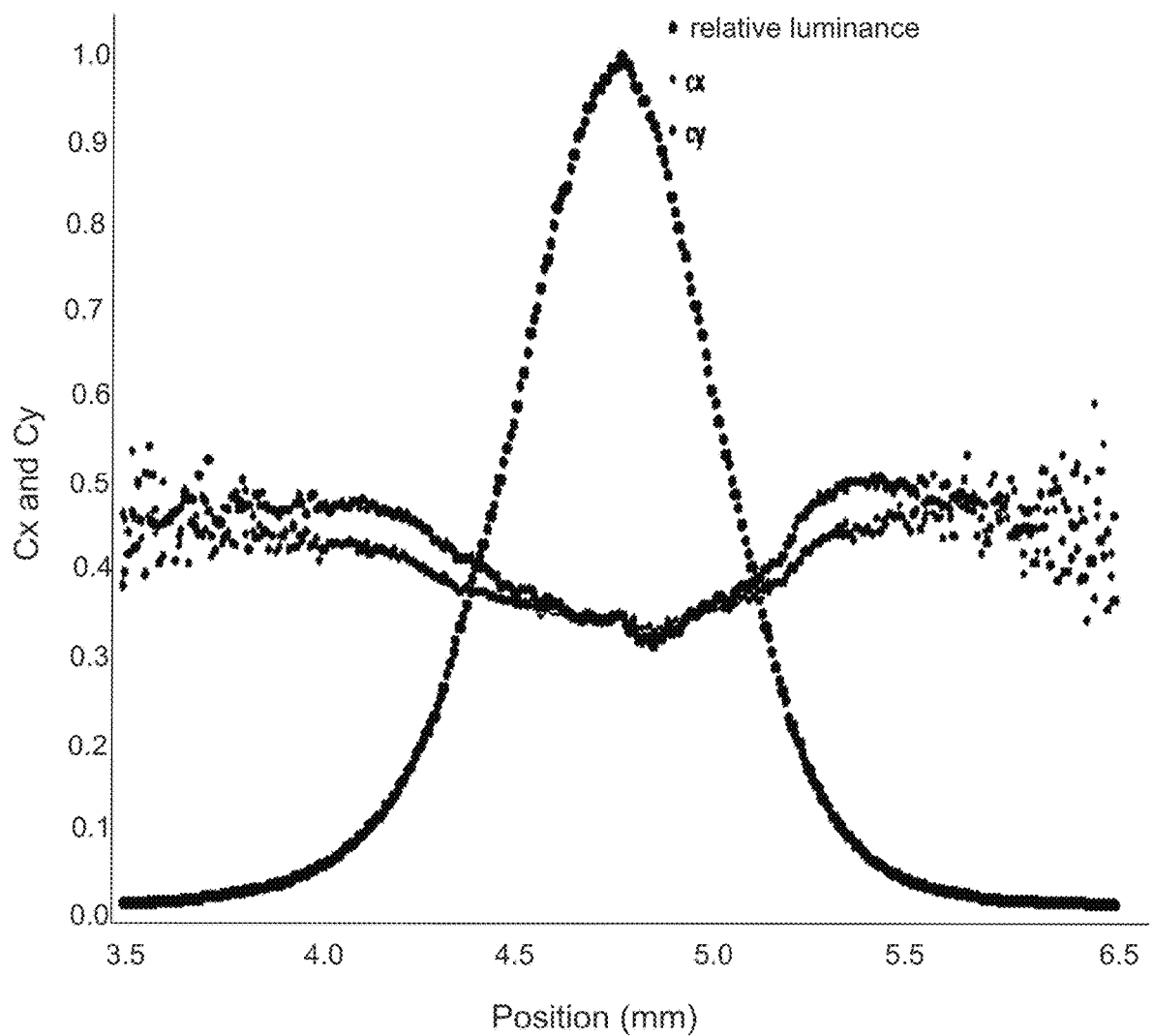
FIG. 4 measurement curves of the luminance and the cx and cy color coordinates of the secondary light, plotted vs. the position on the front side of the converter.

FIG. 4 shows the course of the intensity of the laser excitation 352 of a blue laser and the cx color coordinate 354 and cy color coordinate 356 of the secondary light belonging thereto, plotted vs. the position on the front side 310, or vs. the position in the light spot of the planar light conversion element 300 shown in FIG. 3. In the case of a planar converter, when it is stimulated with a blue light, it is shown surprisingly that the color coordinates 354, 356 are not constant over the spatial extent of the light spot. A variation of the color coordinates vs. the position of the light spot can be seen here in the region of 0.3 to 0.5. The increase in the color coordinates toward the edge of the light spot is essentially rendered by the scatter properties of the phosphor. The yellow component is increased at the edge of the light spot.

In order to ensure the homogeneity of optical parameters over the light spot and the precise alignment of the converter material to the laser spot, a part of the converter can be removed from a converter via, e.g., laser ablation or other methods, so that the converter is shaped in a targeted manner, whereby the optical properties of the light spot can be adjusted to the requirement, such as, e.g., the homogeneity of the color coordinates over the light spot. Moreover, a central arrangement of the converter relative to the laser spot can be carried out by means of an alignment element (alignment structure).

Figure 5:
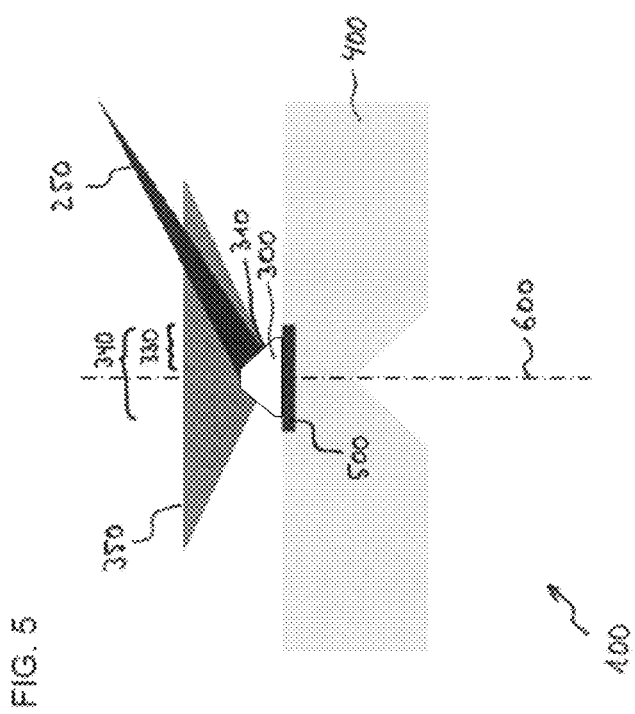
FIG. 5 a lighting device having a converter with variable thickness, wherein the front side is tapered at the edges of the converter.
Figure 6:
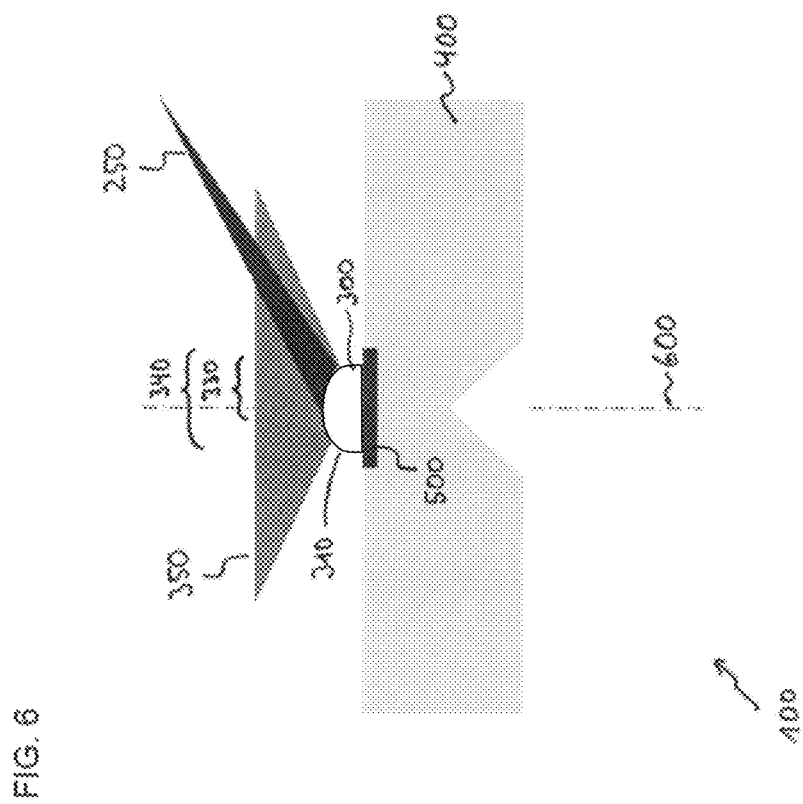
FIG. 6 a lighting device having a converter with variable thickness, wherein the front side has a convex curvature.

FIG. 5 and FIG. 6 show two embodiments, in which the shape of the converter is adapted to the optical properties. The light conversion element 300 is arranged on an alignment element 500, which in turn is applied onto a heat sink 400, so that the light conversion element 300 is fastened indirectly on the heat sink 400. In both embodiments, the converter 300 is made thinner at the edges removed from the central axis 600, wherein the converter is tapered out toward the edge in FIG. 5, while in FIG. 6, it has a convex front side 310.

By the reduction of converter material at the edge of the light spot, the yellow component can be reduced at this spatial position. Thus, the yellow-converted blue component of the laser is also reduced and thus the color coordinates are smaller. In this way, the homogeneity of the color coordinates is caused to clearly increase. The precise synchronization of the optical parameters in the light spot is made possible by the precise alignment of the converter to the laser spot by means of the alignment element 500, which is applied onto the base body 400.

It is obvious to the person skilled in the art that the above-described embodiments are to be understood as examples and the invention is not limited to the theses, but rather can be varied in many ways without departing from the scope of protection of the claims. Further, it is obvious that the features also define individual essential components of the invention, independent of whether they are disclosed in the description, the claims, the figures, or in any other way, even if they are described in common together with other features, and thus can be viewed as disclosed independently of one another. The description of features of one exemplary embodiment applies also in each case to the other exemplary embodiments.

What is claimed is:

1. A lighting device, comprising:
a light conversion element having a front side defining a primary light receiving surface and a secondary light emitting surface; and
a light emitting unit that emits primary light on the primary light receiving surface, the light conversion element being configured to convert the primary light to a secondary light of another wavelength and to emit the secondary light from the secondary light emitting surface,
wherein the light conversion element has a variable thickness at the primary light receiving surface and/or the secondary light emitting surface, and
wherein the light emitting unit is arranged so that the primary light is emitted on the primary light receiving surface along an optical axis that has an angle of greater than 30 degrees and 20 degrees or less relative to a central axis of the light conversion element and/or the light emitting unit is arranged so that the primary light is emitted on the primary light receiving surface along an optical axis that has an angle of greater than 30 degrees relative to an optical axis of the secondary light.

2. The lighting device of claim 1, wherein the light emitting unit comprises a device selected from a group consisting of a light source, a laser light source, a light guide, a fiber optic light guide, a lens, and combinations thereof.

3. The lighting device of claim 1, wherein the light emitting unit emits the primary light so that the primary light irradiates the primary light receiving surface of smaller than 1 square millimeter.

4. The lighting device of claim 1, wherein the light emitting unit has a radiant power of at least 0.5 W.

5. The lighting device of claim 1, wherein the light conversion element has in a center through which a central axis, wherein the center has a greater thickness than at an edge distanced from the central axis.

6. The lighting device of claim 1, wherein the front side of the light conversion element has a shape selected from a group consisting of curved, convex, and tapered from a center to an edge.

7. The lighting device of claim 1, wherein the variable thickness comprises a maximum thickness greater than 0.1 mm and a minimum thickness less than 0.1 mm.

8. The lighting device of claim 1, wherein the variable thickness is configured so that a color coordinate of the secondary light varies over the secondary light emitting surface by less than 0.25.

9. The lighting device of claim 1, further comprising a heat sink, wherein the light conversion element has a back side that is indirectly or directly on the heat sink.

10. The lighting device of claim 1, further comprising an alignment element configured to align the light conversion element and the primary light relative to one another, wherein the light conversion element has a back side on the alignment element.

11. A light conversion element, comprising:
a front side defining a primary light receiving surface and a secondary light emitting surface;
a variable thickness at the primary light receiving surface and/or the secondary light emitting surface, wherein the light conversion element is configured to convert primary light emitted onto the primary light receiving surface to a secondary light of another wavelength and to emit the secondary light from the secondary light emitting surface; and
a center through which a central axis runs, the variable thickness being greater at the center than at an edge distanced from the central axis.

12. The light conversion element of claim 11, wherein the front side of the light conversion element has a shape selected from a group consisting of curved, convex, and tapered from a center to an edge.

13. The light conversion element of claim 11, wherein the variable thickness comprises a maximum thickness greater than 0.1 mm and a minimum thickness less than 0.1 mm.

14. The light conversion element of claim 11, wherein the variable thickness is configured so that a color coordinate of the secondary light varies over the secondary light emitting surface by less than 0.25.

15. The light conversion element of claim 11, further comprising a heat sink, wherein the light conversion element has a back side that is indirectly or directly on the heat sink.

16. The light conversion element of claim 11, further comprising a back side having an alignment element configured to align primary light receiving surface relative to a source of the primary light.

17. A method for processing a light conversion element, comprising:
providing a light conversion element configured to convert primary light to secondary light of another wavelength, the light conversion element having a center through which a central axis runs and having a front side defining a primary light receiving surface and a secondary light emitting surface; and
processing of the light conversion element by removing material from the light conversion element to provide a local thickness change of the light conversion element, wherein the local thickness change results in a thickness that is greater at the center than at an edge distanced from the central axis.

18. The method of claim 17, wherein the material is removed from a front side and/or an edge of the light conversion element.

19. The method of claim 17, wherein the local thickness change is configured so that a color coordinate of the secondary light varies by less than 0.25.

20. The method of claim 17, further comprising arranging the light conversion element onto a heat sink and/or an alignment element.

* * * * *